(12) United States Patent
Guernalec

(10) Patent No.: US 7,380,851 B2
(45) Date of Patent: Jun. 3, 2008

(54) COVERING AN EQUIPMENT MODULE WHOSE WALL IS PROVIDED WITH A REAR VISION CAMERA

(75) Inventor: Stevan Guernalec, Auffargis (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 10/571,362

(22) PCT Filed: Sep. 7, 2004

(86) PCT No.: PCT/EP2004/009958

§ 371 (c)(1),
(2), (4) Date: Mar. 10, 2006

(87) PCT Pub. No.: WO2005/023593

PCT Pub. Date: Mar. 17, 2005

(65) Prior Publication Data
US 2007/0013207 A1    Jan. 18, 2007

(30) Foreign Application Priority Data
Sep. 10, 2003    (FR) ................. 03 10676

(51) Int. Cl.
*B60J 9/00* (2006.01)
(52) U.S. Cl. .......... 296/1.08; 296/146.7; 428/31
(58) Field of Classification Search ............... 296/1.08, 296/56; 428/31
See application file for complete search history.

(56) References Cited

U.S. PATENT DOCUMENTS

| | | | | |
|---|---|---|---|---|
| 3,959,537 A | * | 5/1976 | Loew | 428/31 |
| 4,101,698 A | * | 7/1978 | Dunning et al. | 428/31 |
| 4,113,295 A | * | 9/1978 | Wenrick | 428/31 |
| 4,363,839 A | * | 12/1982 | Watanabe et al. | 428/31 |
| 5,308,112 A | * | 5/1994 | Hill et al. | 280/730.2 |
| 5,456,957 A | * | 10/1995 | Jackson et al. | 428/31 |
| 5,536,540 A | * | 7/1996 | Borys et al. | 428/31 |
| 5,597,233 A | * | 1/1997 | Lau | 362/294 |
| 5,641,547 A | * | 6/1997 | Dilley | 428/31 |

(Continued)

FOREIGN PATENT DOCUMENTS

JP        9-240371        3/1996

(Continued)

OTHER PUBLICATIONS

Patent Abstracts of Japan; Publication No. 09301094; Publication Date: Nov. 25, 1997.

(Continued)

*Primary Examiner*—Kiran B. Patel
(74) *Attorney, Agent, or Firm*—Osha Liang LLP

(57) ABSTRACT

The invention relates to a covering (18) for the equipment module (16) of a motor vehicle (10) which is longitudinally projected backward with respect to the transversal vertical rear panel (12) of the vehicle (10) and comprises a first wall (28) generally horizontally extending backward from the rear panel (12), a second transversal wall (30) which is arranged above the first wall (28) and inclined thereto. Said inventive covering is characterised in that it comprises a third intermediate wall (38) forming a chamfer which is vertically mounted between the first (28) and second (30) walls and is inclined thereto.

7 Claims, 2 Drawing Sheets

U.S. PATENT DOCUMENTS

| | | | |
|---|---|---|---|
| 5,684,633 A * | 11/1997 | Lutz et al. | 359/588 |
| 5,799,385 A * | 9/1998 | Vecchiarino et al. | 296/146.7 |
| 5,927,020 A * | 7/1999 | Kobrehel | 49/502 |
| 5,932,331 A * | 8/1999 | Jones et al. | 296/146.7 |
| 6,063,460 A * | 5/2000 | Souders et al. | 428/31 |
| 6,116,750 A * | 9/2000 | Hentz | 362/148 |
| 6,160,475 A * | 12/2000 | Hornung et al. | 340/461 |
| 6,196,606 B1 * | 3/2001 | McGoldrick | 296/37.13 |
| 6,350,046 B1 * | 2/2002 | Lau | 362/364 |
| 6,433,680 B1 | 8/2002 | Ho | |
| 6,438,899 B1 * | 8/2002 | Feder et al. | 296/146.7 |
| 6,805,928 B2 * | 10/2004 | Piec et al. | 428/31 |
| 6,865,811 B2 * | 3/2005 | Wycech | 29/897.2 |
| 6,921,571 B2 * | 7/2005 | Funakoshi | 296/1.08 |
| 2005/0115155 A1 * | 6/2005 | Ottino et al. | 49/502 |

FOREIGN PATENT DOCUMENTS

| | | |
|---|---|---|
| JP | 9-240370 | 9/1997 |
| JP | 9-301094 | 11/1997 |
| JP | 2003-2115 | 1/2003 |
| WO | WO-03/002363 A1 | 1/2003 |

OTHER PUBLICATIONS

Patent Abstracts of Japan; Publication No. 02940370; Publication Date: Sep. 16, 1997.

Patent Abstracts of Japan; Publication No. 09240371; Publication Date: Sep. 16, 1997.

Patent Abstracts of Japan; Publication No. 2003002115; Publication Date: Jan. 08, 2003.

* cited by examiner

COVERING AN EQUIPMENT MODULE WHOSE WALL IS PROVIDED WITH A REAR VISION CAMERA

The invention relates to a motor vehicle equipment module having a wall that faces downwards and rearwards.

The invention relates more particularly to trim for an equipment module of a motor vehicle, the trim being of the type projecting longitudinally rearwards relative to a rear transverse vertical panel of the vehicle, the trim being of the type having a bottom first wall that extends substantially horizontally rearwards from the rear panel, a top second wall that substantially forms a transverse strip, that is arranged above the first wall, and that is inclined relative to the first wall so that the top transverse edge of the second wall is situated in front of the bottom transverse edge of the second wall.

Some motor vehicles currently have a rear door or hatchback door that extends substantially in a vertical transverse plane. That door carries, in particular, the rear license plate of the vehicle and an equipment module arranged above the license plate.

The equipment module or "strip" projects rearwards relative to the rear vertical transverse face of the rear door, and it has exterior trim which extends mainly transversely, which is fastened to the rear door, and inside which various accessories are arranged, such as, for example, lighting means for lighting up the license plate, and a handle for unlocking and opening/closing the rear door.

The exterior trim defines an internal volume inside which the various elements of equipment are arranged, and which is defined by the rear vertical transverse face of the rear door, by a horizontal bottom wall, and by a top second wall.

The bottom wall extends substantially longitudinally rearwards from the rear face of the rear door, and it carries, in particular, the handle for opening the rear door.

The second wall is arranged above the bottom wall, and it faces substantially rearwards and upwards, i.e. its top transverse edge is arranged longitudinally in front of its bottom transverse edge.

The internal volume of the trim is sometimes defined by a horizontal top wall that extends longitudinally rearwards from the rear face of the rear door to the top transverse edge of the second wall.

The bottom wall is provided with a plurality of openings that are associated respectively with the lighting means for lighting up the license plate, or with the handle for opening/closing the rear door.

Among the various accessories of the motor vehicle, there exists a rear view camera that is part of a parking assistance system enabling the driver to see low obstacles situated behind the vehicle and out of the field of vision of the driver.

The camera is relatively small, enabling it to be arranged inside the trim of the equipment module. In addition, the high position of the equipment module increases the effectiveness of detection of obstacles by the parking assistance system.

The main axis of the camera is directed downwards and rearwards. Unfortunately, as mentioned above, the walls of the trim face either downwards only or upwards and rearwards, and they are not therefore perpendicular to the optical axis of the camera.

Thus, if the camera is mounted entirely inside the trim, the protective glass of the camera is not perpendicular to the optical axis, and it can then cause optical deformation, which reduces the effectiveness of the camera.

In order to avoid such optical deformation, it has been proposed to arrange the camera at least partially outside the trim. The camera then forms a protuberance relative to the trim, which protuberance is then more exposed to impacts and spoils the overall appearance of the module.

An object of the invention is to provide trim that enables the camera to be incorporated within its internal volume without adversely affecting the effectiveness of said camera.

To this end, the invention provides trim of the above-described type, characterized in that it further comprises at least an intermediate third wall that forms a bevel and that is inclined relative to the first wall and relative to the second wall.

According to other characteristics of the invention:

the third wall faces substantially rearwards and downwards so that its top transverse edge is arranged behind its bottom transverse edge;

the third wall is provided with an opening which is closed off by a transparent element and which is arranged on the optical axis C of a component of the equipment module;

the third wall is substantially perpendicular to the optical axis C of the component;

the opening is arranged transversely substantially in the middle of the third wall;

the third wall can be provided with at least one second opening which is closed off by an element that is permeable to the waves that can be transmitted and/or received by another component associated with the equipment module;

the second wall and/or the third wall is/are substantially convex;

the section(s) on a vertical plane of the second wall and/or of the third wall is/are rectilinear; and the trim comprises a fourth wall that extends horizontally rearwards from the rear vertical face of the rear transverse vertical panel to the top transverse edge of the second wall.

Other characteristics and advantages of the invention will appear on reading the following detailed description which, to make it easier to understand, is given with reference to the accompanying figures, in which.

For the description of the invention, and by way of non-limiting example, let the vertical, longitudinal, and transverse directions be as shown in the reference frame V, L, T indicated in the figures.

Figure 1:
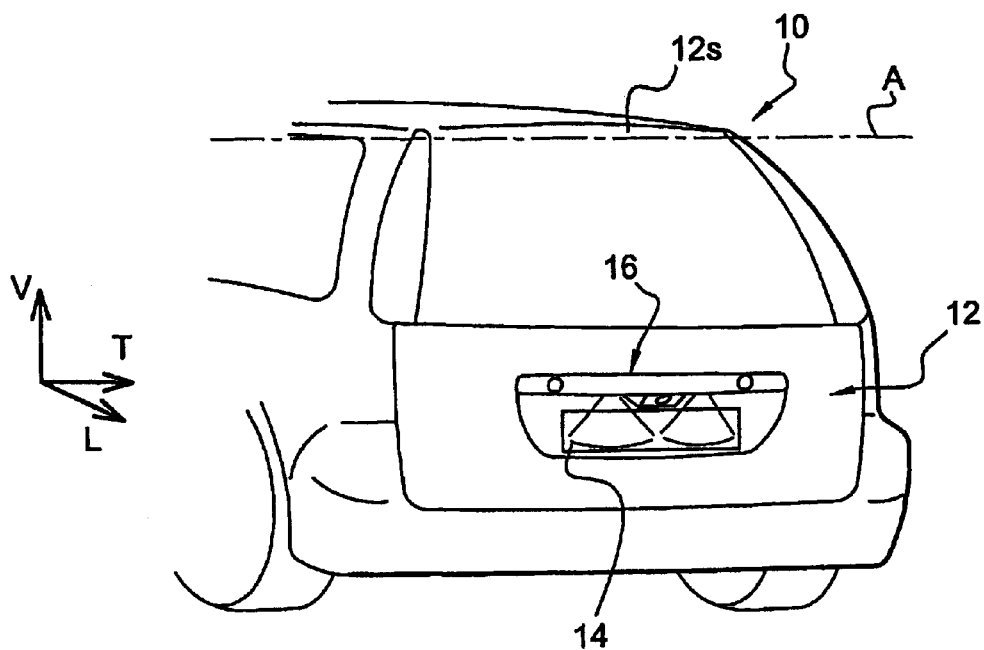
FIG. 1 is a diagrammatic perspective view of the rear portion of a motor vehicle including an equipment module whose exterior trim is trim of the invention.

Let the forward direction be the longitudinal direction from right to left with reference to FIG. 1.

In the following description like reference numerals are used to designate elements that are identical, similar or analogous.

FIG. 1 shows a motor vehicle 10 provided with a rear door 12 which extends substantially in a transverse vertical plane and which is hinged at its top end 12s about a transverse axis A.

The rear door 12 carries the rear license plate 14 of the vehicle and an equipment module 16 which is arranged above the rear license plate 14.

The equipment module or "strip" 16 is substantially in the shape of a transverse bar that projects rearwards relative to the vertical transverse plane of the license plate 14.

Figure 2:
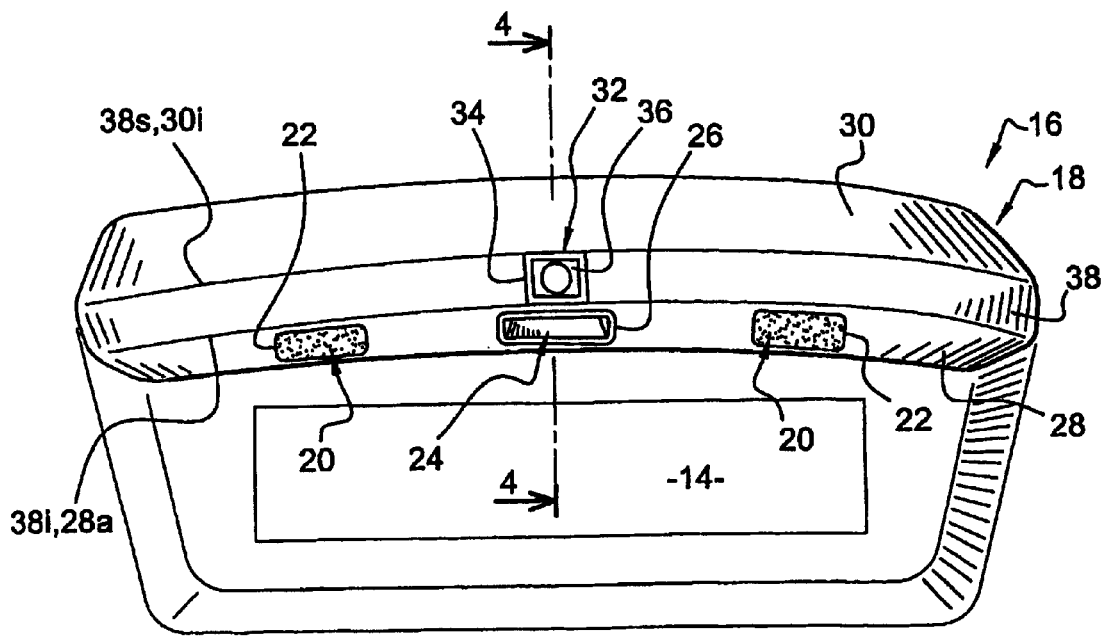
FIG. 2 is a detail view on a larger scale of the module shown in FIG. 1.

As can be seen in more detail in FIG. 2, the equipment module 16 is provided with exterior trim 18 which defines an internal volume inside which the various elements of equipment of the equipment module 16-are arranged, and which is provided with means (not shown) for fastening it to the rear transverse vertical face of the rear door 12.

The equipment module 16 is provided with a handle 24 for unlocking and opening/closing the rear door 12, which handle passes through a complementary opening 26 in the trim 18, and with lighting means for lighting up the rear license plate 14.

The lighting means for lighting up the rear license plate 14 comprise light sources (not shown) that are arranged in the internal volume of the trim 18 and lamp elements 20 (of which there are two in this example) distributed transversely on either side of a vertical longitudinal midplane P of the trim 18. Each of the lamp elements 20 closes off a complementary opening 22 in the trim 18, and they are designed so as to direct most of the light flux generated by each of the light sources towards the rear license plate 14.

The internal volume of the trim 18 is defined by the rear vertical wall of the rear door 12, by a substantially horizontal bottom first wall 28 which extends longitudinally rearwards from the rear wall of the rear door 12, and by a top wall 30 that slopes relative to the bottom wall 28, and relative to the rear door 12 so as to face upwards and rearwards.

The bottom wall 28 faces downwards, and it is provided with the openings 22, 26 associated with the lamp elements 20 and with the handle 24.

The top wall 30 faces upwards and rearwards, and therefore its top transverse edge is arranged in front of its bottom transverse edge 30i.

The equipment module 16 is also provided with a rear view camera 32 which is part of a system for giving assistance with parking the vehicle 10. The camera 32 makes it possible to detect any low obstacles situated behind the vehicle 10, outside the field of vision of the driver. For this purpose, the optical axis C of the camera 32 is directed rearwards and downwards relative to the equipment module 16.

The camera 32 is arranged inside the trim 18, and therefore the trim 18 is provided with an opening 34 closed off by a transparent optical element 36, such as a protective glass, for example.

In order to prevent the protective glass 36 causing optical deformations that are too large, it must extend in a plane that is substantially perpendicular to the optical axis C of the camera 32, i.e. it must face rearwards and downwards.

However, neither the bottom wall 28 nor the top wall 30 face rearwards and downwards simultaneously.

That is why, in the invention, the trim 18 has an intermediate third wall 38 which is arranged between the bottom wall 28 and the top wall 30, and which faces rearwards and downwards.

The intermediate wall 38 then forms a bevel whose top edge 38s is connected to the bottom edge 30i of the top wall 30, and is arranged behind the bottom edge 38i of the intermediate wall 38, which is connected to the rear edge 28a of the bottom wall 28.

Since the opening 34 associated with the camera 32 is provided in the intermediate wall 38, which extends in a plane that is substantially perpendicular to the optical axis C of the camera 32, the intermediate wall 38 is inclined relative to the bottom wall 28 at an angle that is determined as a function of the angle of inclination defined by the optical axis C of the camera 32 and by the longitudinal axis.

In addition, since the intermediate wall 38 is designed in a manner such as to carry the opening 34 associated with the camera 32, the opening 34 can be positioned in the intermediate wall 38 in a manner such as to optimize the effectiveness of the camera 32.

Thus, in a preferred embodiment of the invention, the opening 34 is arranged transversely substantially in the middle of the intermediate wall 38, and the camera 32 is then arranged above the handle 24.

However, it can be understood that the invention is not limited to this embodiment, and that the opening 34, and thus the camera 32 can have any other transverse position on the intermediate wall 38.

In addition to the opening 34 associated with the camera 32, the intermediate wall 38 is suitable for receiving other elements of equipment, and optionally for being provided with other openings associated with said other elements of equipment.

Figure 3:
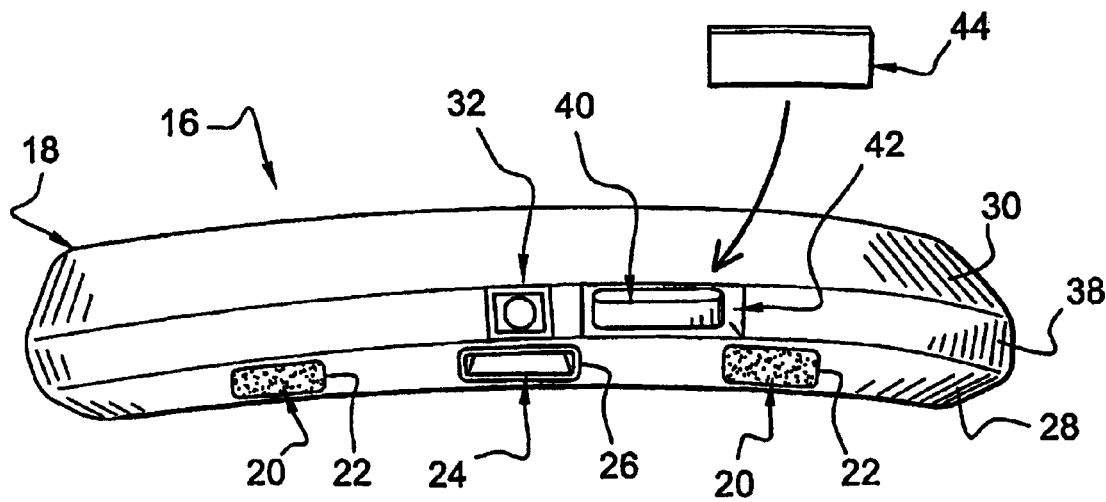
FIG. 3 is a view similar to the FIG. 2 view, showing a variant embodiment of the equipment module, which has a top fourth wall, and an additional accessory.

Thus, as is shown in FIG. 3, the equipment module 16 is provided with a fourth element of equipment 40, such as, for example, a radar for giving assistance with parking, an antenna for remotely unlocking the rear door 12, or indeed rear reversing lamps or rear fog lamps.

The intermediate wall 38 is then provided with an opening 42 associated with said fourth element of equipment 40, which opening is closed off by an element 44 that is permeable to the waves transmitted and/or received by the fourth element of equipment 40, i.e. electromagnetic waves or indeed light waves, in particular infrared light waves.

Figure 4:
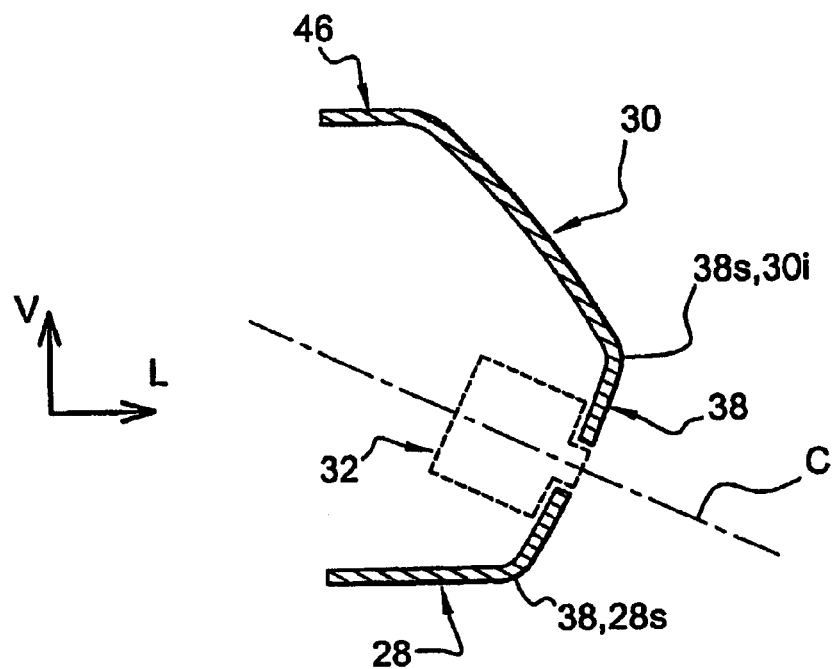
FIG. 4 is a vertical section view on line 4-4 of a variant embodiment of the equipment module for which the trim has a horizontal top fourth wall.

Here, the trim 18 has three walls, so that the top edge of the top wall 30 is connected to the rear face of the rear door 12. However, it is understood that the equipment module 16 is not limited to this embodiment, and that the trim 18 can have a top fourth wall 46 that extends horizontally rearwards from the rear face of the rear door 12 to the top edge of the top face 30, as shown in FIG. 4.

In another aspect of the invention, the trim 18 is shaped so that the transverse ends of each wall 28, 30, 38, 46 are connected to the rear face of the rear door 12. For this purpose the top wall 30 and the intermediate wall 38 are curved so that their sections on horizontal planes are rearwardly convex.

In addition, the section(s) on a vertical plane of the top wall 30 and/or of the intermediate wall 38 can be curved so that the top wall 30 and/or the intermediate wall 38 is/are rearwardly convex, making it possible for the equipment module 16 to have a pleasing appearance, or indeed the section(s) on a vertical plane of the top wall 30 and/or of the intermediate wall 38 can be rectilinear.

In order to prevent causing a "break" in the shape of the intermediate wall 38, be said section on a vertical plane curved or rectilinear, the protective glass 36 associated with the camera 32, and the element 44 associated with the fourth element of equipment 40 has the same shape as the intermediate wall 38, i.e. their sections on a vertical plane are respectively curved or rectilinear, and their sections on horizontal planes are curved.

It is to be understood that the invention is not limited to the above-described embodiment and that the equipment module 16 can be provided with other elements of equipment in addition to the above-mentioned elements, arranged on one or the other of the walls of the trim 18. Thus, for example, rear lamps, such as brake lamps or fog lamps, can be arranged on the top wall 30.

The trim 18 makes it possible to incorporate into the equipment module 16 a transmitter camera 32 whose optical axis is directed rearwards and downwards, while avoiding the need to provide the trim 18 with a protuberance relative to its walls for accommodating the camera 32.

As a result, the camera 32 is better protected from any impacts, and the general appearance of the equipment module 16 is improved.

What is claimed is:

1. Trim for an equipment module of a motor vehicle, the trim type projecting longitudinally rearwards relative to a rear transverse vertical panel of the vehicle, comprising:
    a bottom first wall that extends substantially horizontally rearwards from the rear panel;
    a top second wall that substantially forms a transverse strip, that is arranged above the first wall, and that is inclined relative to the first wall so that a top transverse edge of the second wall is situated in front of a bottom transverse edge of the second wall;
    at least an intermediate third wall that forms a bevel and that is inclined relative to the first wall and relative to the second wall,
    wherein the intermediate third wall faces substantially rearwards and downwards so that its top transverse edge is arranged behind its bottom transverse edge, and wherein the intermediate third wall is provided with an opening which is closed off by a transparent element and which is arranged on an optical axis of a camera of the equipment module.

2. The trim according to claim 1, wherein the intermediate third wall is substantially perpendicular to the optical axis of the camera.

3. The trim according to claim 2, wherein the opening is arranged transversely substantially in the middle of the intermediate third wall.

4. The trim according to claim 1, wherein the intermediate third wall is provided with at least a second opening which is closed off by an element that is permeable to the waves that is at least one of transmitted and received by a another component associated with the equipment module.

5. The trim according to claim 1, wherein at least one of the second wall and the intermediate third wall is substantially convex.

6. The trim according to claim 1, wherein at least one section on a vertical plane of at least one of the second wall and the intermediate third wall is rectilinear.

7. The trim according to claim 1, wherein the trim comprises a fourth wall that extends horizontally rearwards from the rear vertical face of the rear transverse vertical panel to the top transverse edge of the second wall.

* * * * *